US007158756B2

(12) United States Patent
Palin et al.

(10) Patent No.: US 7,158,756 B2
(45) Date of Patent: Jan. 2, 2007

(54) METHOD AND SYSTEM FOR ESTABLISHING SHORT-RANGE SERVICE SESSIONS

(75) Inventors: Arto Palin, Viiala (FI); Juha Salokannel, Kangasala (FI); Jari P. Leppänen, Nokia (FI)

(73) Assignee: Nokia Corporation, Espoo (FI)

( * ) Notice: Subject to any disclaimer, the term of this patent is extended or adjusted under 35 U.S.C. 154(b) by 566 days.

(21) Appl. No.: 10/602,661

(22) Filed: Jun. 25, 2003

(65) Prior Publication Data

US 2004/0266347 A1 Dec. 30, 2004

(51) Int. Cl.
*H04B 7/00* (2006.01)

(52) U.S. Cl. ............ 455/41.2; 455/411; 380/270; 713/150

(58) Field of Classification Search ........... 455/41.2, 455/41.3, 410, 411; 380/270; 713/150, 713/151

See application file for complete search history.

(56) References Cited

U.S. PATENT DOCUMENTS

| 6,766,160 B1 * | 7/2004 | Lemilainen et al. ........ 455/411 |
| 6,845,097 B1 * | 1/2005 | Haller et al. ............... 370/352 |
| 2002/0197956 A1 | 12/2002 | Annola et al. |

FOREIGN PATENT DOCUMENTS

| EP | 1 253 539 A2 | 10/2002 |
| EP | 1 253 540 A2 | 10/2002 |
| EP | 1255383 A2 | 11/2002 |
| WO | WO 99/45684 | 9/1999 |
| WO | WO 02/076024 A1 | 9/2002 |

OTHER PUBLICATIONS

The Bluetooth Special Interest Group, Specification of The Bluetooth System, vol. 1 & vol. 2, Core and Profile: Version 1.1, Feb. 22, 2001.

* cited by examiner

Primary Examiner—Lee Nguyen
(74) Attorney, Agent, or Firm—Morgan & Finnegan, LLP

(57) ABSTRACT

A method and system for setting up a local service session in a short-range communications network receives preconfiguration information over a long-range network, and establishes the local service session in the short-range communication network using the received preconfiguration information. The preconfiguration information relates to the establishment of the local service session in the short-range communication network. Accordingly, the received preconfiguration information may include an address of a remote short-range communications device, such as a a Bluetooth device address (BD_ADDR). The received preconfiguration information may also include security information, such a personal identification number (PIN), and/or one or more encryption keys. In addition, the preconfiguration information may include an identifier of an offered short-range service, as well as an identifier indicating a location where the short-range service is offered.

49 Claims, 13 Drawing Sheets

METHOD AND SYSTEM FOR ESTABLISHING SHORT-RANGE SERVICE SESSIONS

FIELD OF THE INVENTION

The present invention relates to wireless communications. More particularly, the present invention relates to the establishment of service sessions over short-range wireless communications networks.

BACKGROUND OF THE INVENTION

Short range wireless systems typically involve devices that have a communications range of one hundred meters or less. To provide communications over long distances, these short range systems often interface with other networks. For example, short range networks may interface with cellular networks, wireline telecommunications networks, and the Internet.

Wireless personal area networks (PANs) and wireless local area networks (LANs) are each types of short range wireless systems. PANs and WLANs typically have the common feature of operating in unlicensed portions of the radio spectrum, usually either in the 2.4 GHz Industrial, Scientific, and Medical (ISM) band or the 5 GHz Unlicensed-National Information Infrastructure (U-NII) band. Examples of wireless local area network technology include the IEEE 802.11 WLAN Standard and the HiperLAN Standard. A well-known example of wireless personal area network technology is the Bluetooth Standard.

Bluetooth defines a short-range radio network, originally intended as a cable replacement. It can be used to create ad hoc networks of up to eight devices, where one device is referred to as a master device. The other devices are referred to as slave devices. The slave devices can communicate with the master device and with each other via the master device. The Bluetooth Special Interest Group, *Specification Of The Bluetooth System*, Volumes 1 and 2, Core and Profiles: Version 1.1, Feb. 22, 2001, describes the principles of Bluetooth device operation and communication protocols. This document is incorporated herein by reference in its entirety. The devices operate in the 2.4 GHz radio band reserved for general use by Industrial, Scientific, and Medical (ISM) applications. Bluetooth devices are designed to find other Bluetooth devices within their communications range and to discover what services they offer.

Establishing a short-range communications session requires various processes to be performed. For example, in Bluetooth networks, devices perform an inquiry process to learn the identity of other devices in their communications range. Once a first device learns the identity of another device through the inquiry process, the devices perform a process known as paging to establish an unsecured connection between the two devices.

In addition, when certain security features are desired, terminal devices and access points perform a process known as authentication. Authentication is a process where two devices verify that they both have the same secret key. This secret key can then be used to effect security features, such as link encryption.

Once these processes are complete, the devices may communicate with each other according to one or more applications. For instance, one of the devices may utilize services provided by the other device, such as web browsing, printing, etc. Communicating according to such services is referred to herein as a "service session." For the device to determine the services provided by the other device, Bluetooth provides a protocol known as the Service Discovery Protocol (SDP). SDP enables terminals to identify services offered by other devices. According to SDP, The identification of services involves the exchange of multiple messages between devices.

Thus, the establishment of a connection as well as the discovery and selection of services can involve the exchange of an extensive amount of information. Unfortunately, this may consume large amounts of time and battery power. Moreover, this exchange of information places large demands on network bandwidth, as well as on terminal device and access point processing capacity. Accordingly, techniques are needed for the efficient establishment of service sessions.

As set forth above, devices such as Bluetooth access points can provide different kinds of services for mobile device users. For instance, an access point can deliver different kinds of content and applications to mobile devices within its coverage area. Examples of such applications include interactive game playing and the creation of messages for various purposes, such as the purchasing of movie tickets.

A frequent problem occurs when a mobile device does not contain the necessary software to perform applications provided by devices, such as access points. Accordingly, it is desirable to provide techniques for the installation of access network connectivity software to the mobile terminal. Different methods exist to install such software. For example, a web page may be established that enables a user to download the network connectivity software. Alternatively, connectivity software may be sent by e-mail. Unfortunately, these techniques typically involve long-range networks, which do not enable a user to utilize access network services spontaneously at the location where such services are provided. Accordingly, techniques are also needed for the installation of software that occur during short-range device encounters.

SUMMARY OF THE INVENTION

The present invention is directed to a method and system for setting up a local service session in a short-range communications network. The method and system receives preconfiguration information over a long-range network, and establishes the local service session in the short-range communication network using the received preconfiguration information.

The preconfiguration information relates to the establishment of the local service session in the short-range communication network. Accordingly, the received preconfiguration information may include an address of a remote short-range communications device, such as a Bluetooth device address (BD_ADDR). The received preconfiguration information may also include security information, such as a personal identification number (PIN), and/or one or more encryption keys. In addition, the preconfiguration information may include an identifier of an offered short-range service, as well as an identifier indicating a location where the short-range service is offered.

The method and system may send a request for the preconfiguration information over the long range network. Moreover, the method and system may obtain short-range service application software from the remote device.

A further method and system of the present invention involves setting up a local service session in a short-range communications network between a first wireless communications device and a second wireless communications device. This method and system sends a first preconfiguration transmission over a long-range network to the first wireless communications device, and sends a second preconfiguration transmission over the long-range network to the second wireless communications device. The first and second preconfiguration transmissions include information relating to the establishment of the local service session in the short-range communication network. Accordingly, each of these transmissions may include an address (e.g., a Bluetooth device address) for one of the first and second communications devices. Additionally, each of these transmissions may include security information, such as a personal identification number (PIN).

A wireless communications device of the present invention includes short-range and long-range communications portions for communicating across short-range and long-range wireless communications networks, a memory, and a processor that executes instructions stored in the memory. These instructions are for receiving preconfiguration information over a long-range wireless network, and establishing the local service session in the short-range communications network using the received preconfiguration information.

The present invention enables service sessions to be efficiently established. Further features and advantages of the present invention will become apparent from the following description.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number.

The present invention will be described with reference to the accompanying drawings, wherein.

DETAILED DESCRIPTION OF THE PREFERRED EMBODIMENTS

I. Exemplary Operational Environment

In the following description of the various embodiments, reference is made to the accompanying drawings, which form a part hereof, and in which is shown by way of illustration, various embodiments in which the invention may be practiced. It is to be understood that other embodiments may be utilized and structural and functional modifications may be made without departing from the scope of the present invention.

Before describing the invention in detail, it is helpful to describe an environment in which the invention may be used. Accordingly, FIG. 1 is a block diagram of an operational environment embodying the present invention where wireless devices may obtain preconfiguration information to efficiently establish subsequent short-range communications sessions.

Figure 1:
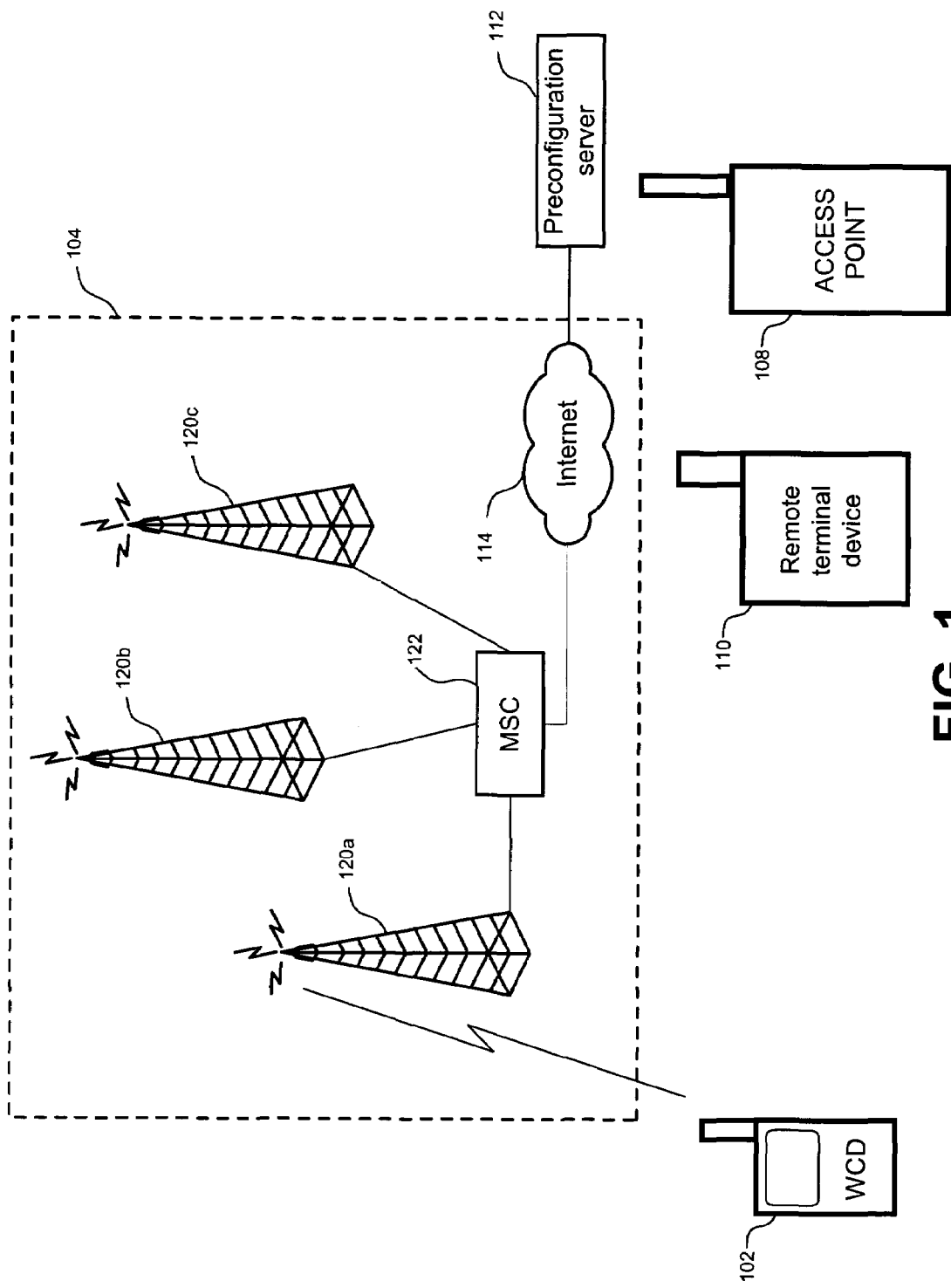
FIG. 1 is a diagram of an exemplary operational environment in which the principles of the present invention may be beneficially implemented.

The environment of FIG. 1 includes a wireless communications device (WCD) 102, which is capable of communicating with devices across various networks. For example, FIG. 1 shows that WCD 102 may communicate across a long-range communication network 104. In addition, WCD 102 may communicate with various remote devices, such as an access point 108 and a remote terminal device 110, through ad-hoc short-range radio networks. Thus, when WCD 102 comes within communicating proximity of a remote short-range device, a short-range wireless communications connection may be established between the two devices. For a Bluetooth, device, a typical communicating range is 10 meters.

Long-range network 104 may include a wireless telephony network. For instance, FIG. 1 shows long-range network 104 having a cellular network. The cellular network includes a plurality of base stations 120, which are each coupled to a mobile switching center (MSC) 122. This cellular network provides for WCD 102 to exchange data according to various standards, such as GSM, EDGE, and GPRS. Long-range network 104 may also include a wireline network. Accordingly, FIG. 1 shows that long-range network 104 includes a packet-based network 114, such as the Internet, which is coupled to the cellular network.

In the context of FIG. 1, the present invention provides techniques for efficiently establishing a short-range connection between WCD 102 and a remote short-range device by preconfiguring WCD 102 for the remote device connection before it enters communicating range of the remote device. This preconfiguration is achieved through communications across long-range network 104. These communications may involve WCD 102 receiving preconfiguration information, such as connection parameters from a preconfiguration server 112, which is coupled to long-range network 104. Alternatively, these communications may involve WCD 102 and another wireless device (such as terminal device 110) exchanging short-range preconfiguration information directly through long-range network 104. This preconfiguration information enables WCD 102 to efficiently establish one or more short-range connections.

Preconfiguration information may be exchanged in various forms. For example, preconfiguration information may be transmitted as one or more messages in a format, such as the short message service (SMS) format. Alternatively, preconfiguration information may be transmitted as request and response messages according to client/server protocols, such as the hypertext transfer protocol (HTTP), or the wireless application protocol (WAP).

II. Exemplary Terminal Device

Figure 2A:
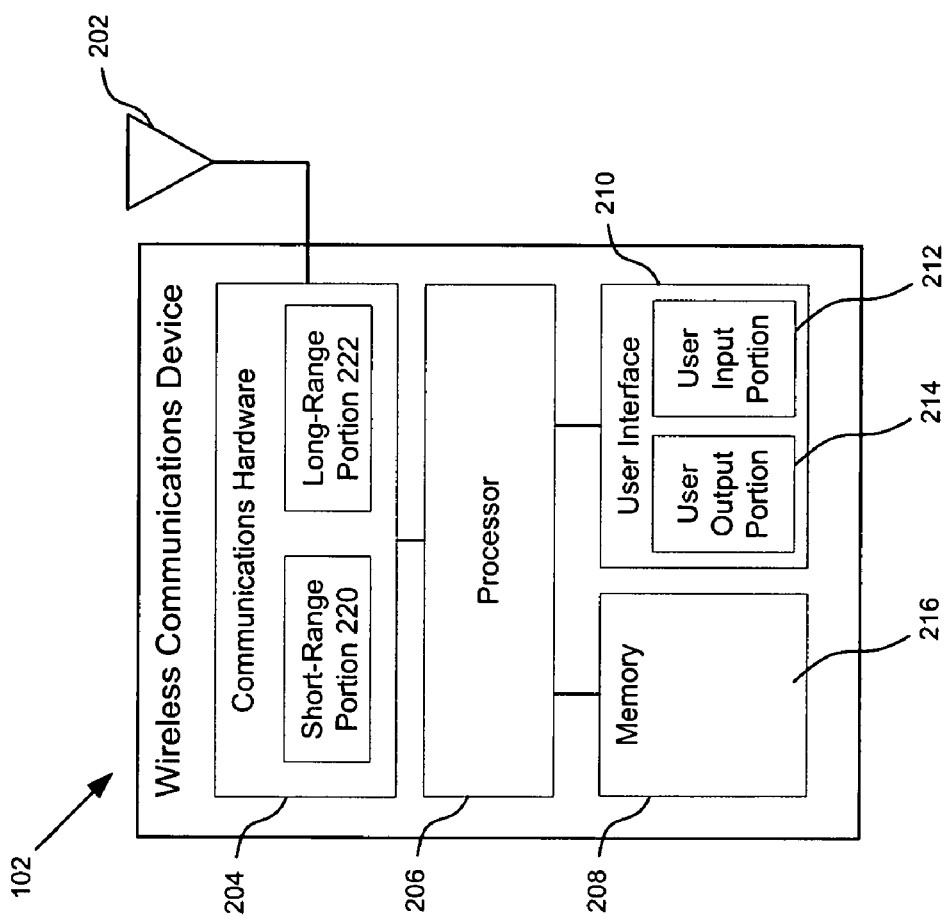
FIGS. 2A and 2B are block diagrams showing an implementation of a wireless communications device according to exemplary embodiments of the present invention.
Figure 2B:
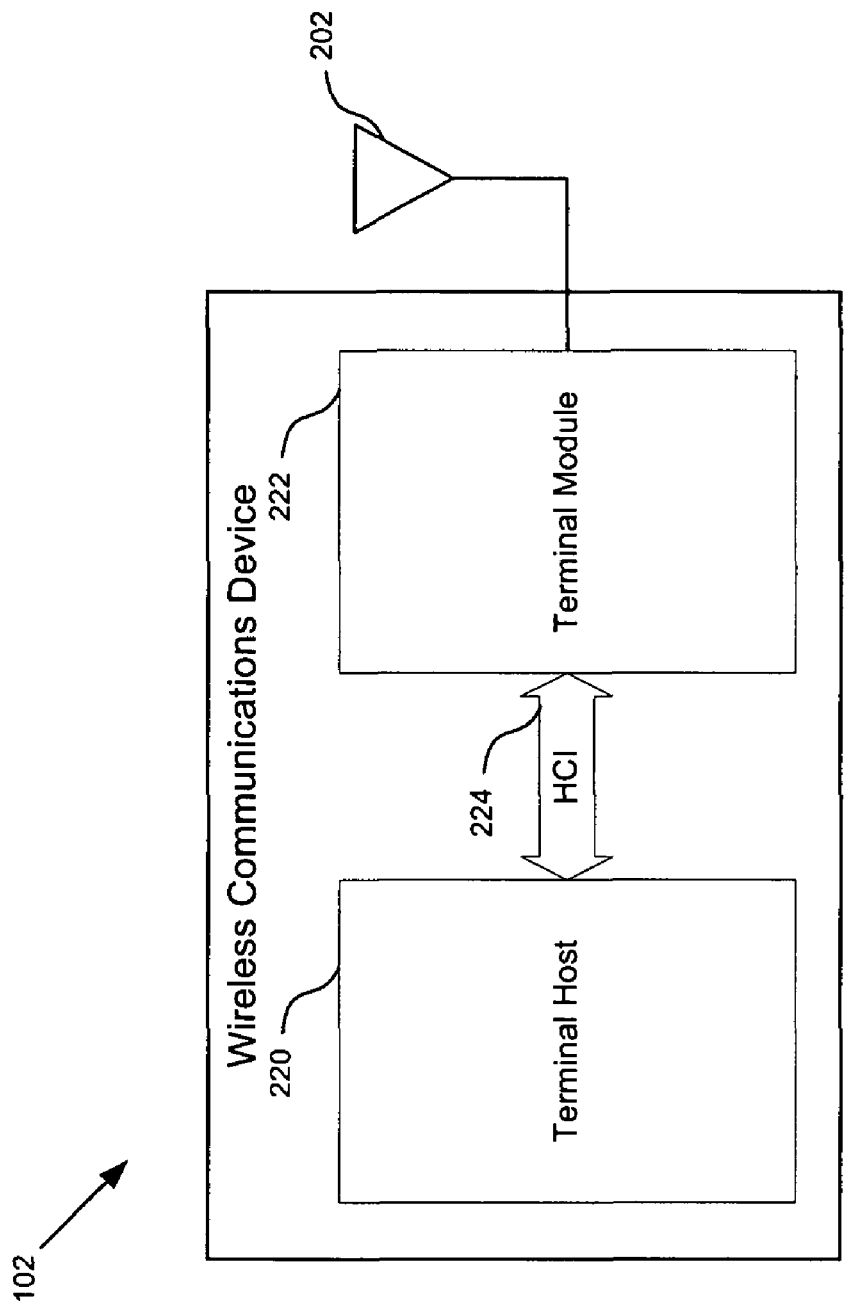

Since the present invention may be employed in environments involving wireless communications, a device capable of engaging in such communications is described. FIGS. 2A and 2B are block diagrams of an exemplary WCD 102 implementation that embodies the present invention. WCD 102 may be a wireless mobile phone, a wireless PDA, a pager, a laptop computer equipped with short-range and long-range communications capabilities, or other wireless devices apparent to persons skilled in the relevant arts.

FIG. 2A shows that WCD 102 includes several components. For instance, WCD 102 includes a communications hardware portion 204 that is coupled to one or more antennas 202. Communications hardware portion 204 includes electronics, such as a transceiver and a diplexer. These electronics allow WCD 102 to engage in bi-directional RF communications with long-range and short-range network entities, such as cellular base stations and Bluetooth access points. As shown in FIG. 2A communications hardware portion 204 may include a short-range wireless portion 220 for allowing WCD 102 to communicate across short-range wireless networks, and a long-range wireless portion 222 for allowing WCD 102 to communicate across long-range wireless networks. Portions 222 and 224 may each include distinct components. In addition, portions 222 and 224 may share certain components. Moreover, portions 222 and 224 may each transmit and receive wireless signals via separate antennas, or may alternatively share one or more antennas.

A processor 206 is coupled to communications hardware portion 204. Processor 206 controls all of the functions of WCD 102. For example, processor 206, instructs and controls the operation of communications hardware portion 204. Processor 206 may be implemented with one or more microprocessors that are each capable of executing software instructions stored in a memory 208.

A user interface 210 is coupled to processor 206. User interface 210 facilitates the exchange of information with a user. FIG. 2A shows that user interface 210 includes a user input portion 212 and a user output portion 214. User input portion 212 may include one or more devices that allow a user to input information. Examples of such devices include keypads, touch screens, and microphones. User output portion 214 allows a user to receive information from WCD 102. Thus, user output portion 214 may include various devices, such as a display (e.g., the aforementioned touch screen), and one or more audio speakers. Exemplary displays include liquid crystal displays (LCDs), and video displays.

Memory 208 stores information in the form of data and software components. These software components include instructions that can be executed by processor 206. Various types of software components may be stored in memory 208. For instance, memory 208 may store software components that control the operations of communications hardware portion 204, and software components that control the exchange of information through user interface 210. In addition, memory 208 stores software components that are associated with user applications that allow WCD 102 to engage in communications sessions with other devices. These communications sessions include telephony and remote server access with devices across long-range network 104, as well as service sessions with short-range devices across ad hoc networks.

The above components may be coupled according to various techniques. One such technique involves coupling communications hardware 204, processor 206, memory 208, and user interface 210 through one or more bus interfaces. In addition, each of these components is coupled to a power source, such as a removable and rechargeable battery pack (not shown).

FIG. 2B is a block diagram illustrating how various functional attributes of the components of FIG. 2A may be allocated between two segments: a terminal host 220, and a terminal module 222. Terminal host 220 is responsible for user applications and higher protocol layers, while terminal module 222 is responsible for lower layer protocols. For example, in Bluetooth communications, terminal module 222 performs link management and link control functions, as well as the transmission and reception of RF signals.

Terminal host 220 and terminal module 222 communicate according to a host controller interface (HCI) 224. For Bluetooth communications, specific formats for messages and/or packets crossing HCI 224 are established. Examples of such standard messages include terminal module 222 requesting a link key from terminal host 220, and terminal host 220 providing a link key to the terminal module 222.

As described above, memory 208 stores software components associated with user applications. Exemplary user applications allow WCD 102 to select and receive preconfiguration information during a session with preconfiguration server 112. Since such user applications may involve the exchange of information with preconfiguration server 112, memory 208 stores software components that enable communications with preconfiguration server 112 according to protocols, such as the short messaging service (SMS) and the wireless application protocol (WAP).

When engaging in WAP communications with preconfiguration server 112, WCD 102 functions as a WAP client. To provide this functionality, terminal host 220 includes WAP client software, such as WAP Client Version 2.0. WAP Client Version 2.0 is a commercially available software product provided by Nokia Corporation of Finland. WAP Client Version 2.0 contains components, such as a Wireless Markup Language (WML) Browser, a WMLScript engine, a Push Subsystem, and a Wireless Protocol Stack.

Application software components stored in memory 208 of WCD 102 interact with the WAP client software to implement a variety of communications applications. Examples of such communications applications include the reception of Internet-based content, such as headline news, exchange rates, sports results, stock quotes, weather forecasts, multilingual phrase dictionaries, personal online calendars, and online travel and banking services.

WAP-enabled WCD 102 may access small files called decks, which are each composed of smaller pages called cards. Cards are small enough to fit into a small display area that is referred to herein as a microbrowser. The small size of the microbrowser and the small file sizes are suitable for accommodating low memory devices and low-bandwidth communications constraints imposed by the wireless portions of communications networks.

Cards are written in the Wireless Markup Language (WML), which is specifically devised for small screens and one-hand navigation without a keyboard. WML is scaleable so that it is compatible with a wide range of displays that covers two-line text displays, as well as large LCD screens found on devices, such as smart phones, PDAs, and personal communicators.

WML cards may include programs written in WMLScript, which is similar to JavaScript. However, through the elimination of several unnecessary functions found in these other scripting languages, WMLScript makes minimal demands on memory 208 and processor 206.

III. Preconfiguration

Figure 3:
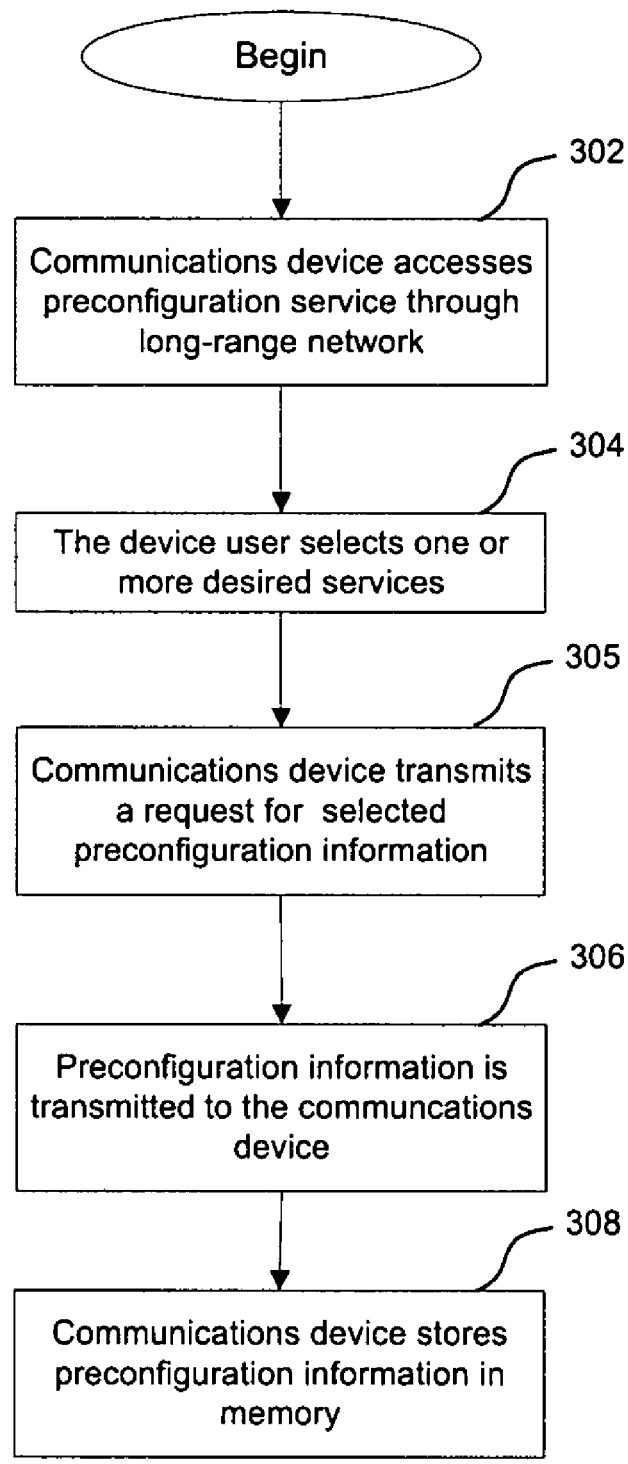
FIG. 3 is a flowchart of a short-range preconfiguration process for a wireless communications device according to an embodiment of the present invention.

As described above, the present invention provides for the preconfiguration of devices to allow subsequent short-range service sessions to be established efficiently. Accordingly, FIG. 3 is a flowchart illustrating a preconfiguration process according to an embodiment of the present invention. This process may be performed in various communications settings, such as the environment of FIG. 1.

As shown in FIG. 3, this preconfiguration process begins with a step 302. In this step, a communications device accesses a preconfiguration service through a long-range network. For example, in the context of FIG. 1, this step comprises WCD 102 accessing preconfiguration server 112 through long-range network 104. This may be performed by WCD 102 transmitting one or more messages according to protocols such as HTTP, and WAP, or according to the short messaging service (SMS).

While accessing this service, the preconfiguration service transmits one or more short-range service selection options to the communications device in the form of one or more messages. These options may be displayed, for example, on the device's touch screen interface as an interactive menu.

In a step 304, the user of the communications device selects one or more desired services. Accordingly, this step comprises the user interacting with the device's user interface to make preconfiguration selections.

Once these selections are made, a step 305 is performed. In this step, the communications device transmits a request to the preconfiguration service (e.g., preconfiguration server 112) for the selected preconfiguration information. Next, in a step 306, preconfiguration information is downloaded to the communications device via the long-range network. The information transmitted in steps 305 and 306 may be in the form of standardized messages, such as SMS messages, WAP messages, and HTTP messages.

In a step 308, the communications device stores the preconfiguration information for subsequent use. Thus, for the WCD 102 implementation of FIG. 2, this step comprises WCD 102 storing the received preconfiguration information in memory 208. At this point, the communications device is ready to efficiently establish short-range service sessions with devices for which it has preconfiguration information.

Figure 4:
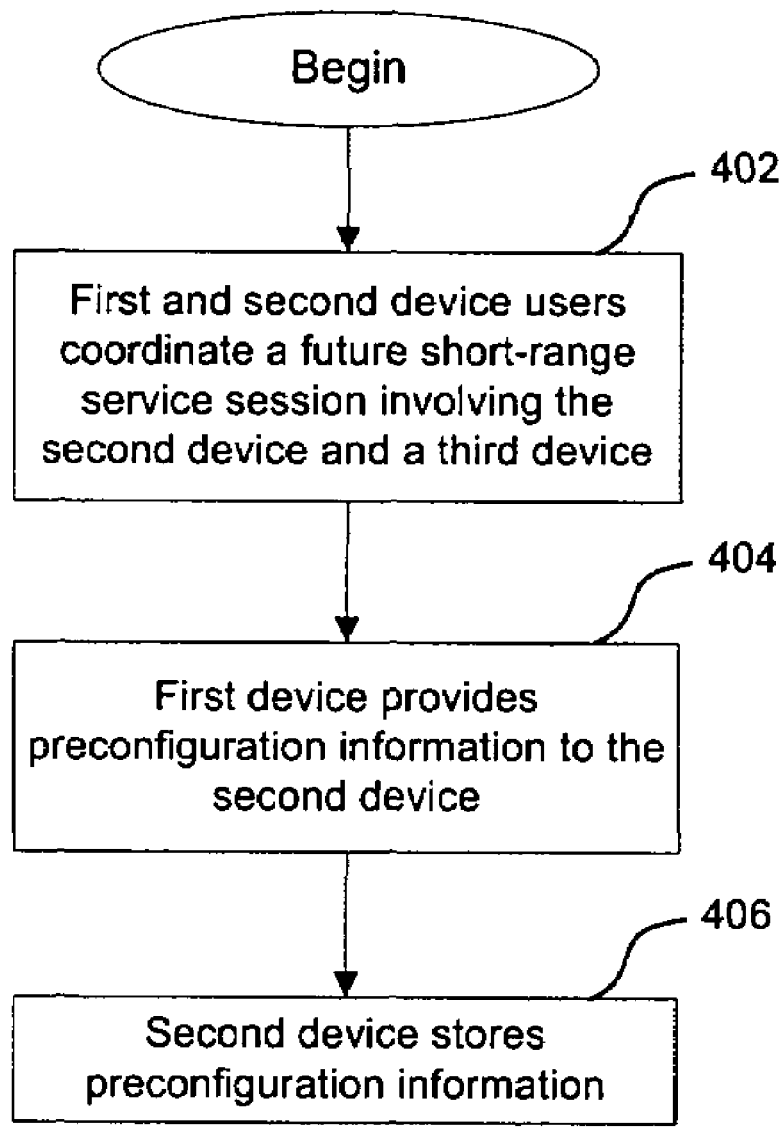
FIGS. 4 and 5 are flowcharts of short-range preconfiguration processes involving multiple wireless communications devices according to embodiments of the present invention.
Figure 5:
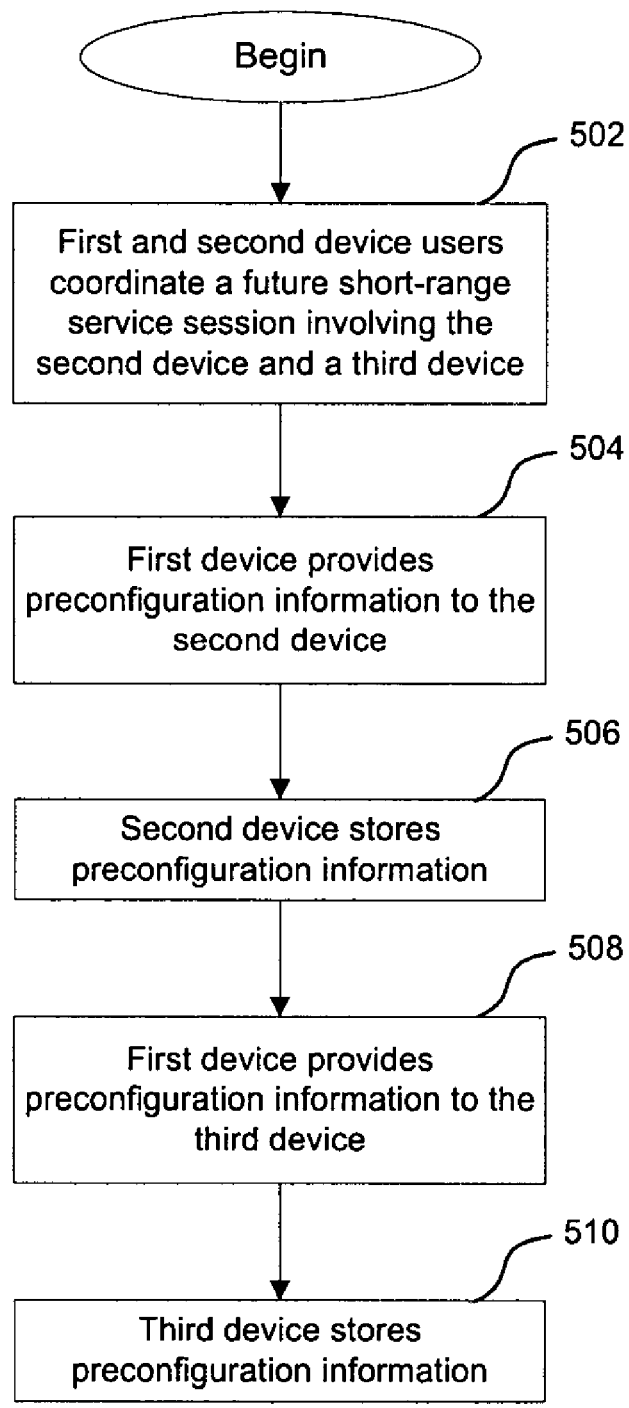

While FIG. 3 describes a wireless device obtaining preconfiguration information for its own subsequent short-range service sessions, a first wireless device may preconfigure another wireless device for subsequent short-range service sessions. Accordingly, FIGS. 4 and 5 are flowcharts of preconfiguration processes involving multiple parties according to embodiments of the present invention. In particular, FIGS. 4 and 5 show preconfiguration processes in which a first device preconfigures a future short-range encounter between a second device and a third device.

The process of FIG. 4 begins with a step 402. In this step, the users of the first and second devices coordinate a future short-range service session between the second device and the third device. More particularly, step 402 comprises these users arriving at a general agreement or understanding to preconfigure the future short-range encounter.

This agreement or understanding may be achieved in various ways involving voice or text communications. Such communications may be performed across communications networks, such as long-range network 104, or an ad-hoc network. Accordingly, the first and second devices may be implemented as the WCD implementation of FIGS. 2A and 2B. Alternatively, such communications may be performed through more traditional means, such as face-to-face conversations or the exchange of paper correspondence.

As shown in FIG. 4, a step 404 follows step 402. In step 404, the first device provides preconfiguration information to the second device via a long-range communications network. This preconfiguration information may be in the form of one or more standardized (e.g., SMS, WAP, or HTTP) messages.

Next, in a step 406, the second device stores the preconfiguration information received in step 404. For second device implementations according to FIGS. 2A and 2B, this step comprises storing the preconfiguration information in memory 208.

Thus, upon completion of step 406, the second device possesses preconfiguration information so that it may efficiently establish a short-range communications session with the third device.

FIG. 5 is a flowchart of a process that is similar to the process of FIG. 4. However, in this process, the first device sends preconfiguration information to both the second and third devices. This enables features, such as verification by both the second and third devices that the preconfigured service session is authorized by the first device.

The process of FIG. 5 begins with a step 502. In this step, the users of the first and second devices coordinate a future short-range service session between the second device and the third device. More particularly, step 502 comprises these users arriving at a general agreement or understanding to preconfigure the future short-range encounter.

As described above with reference to FIG. 4, this agreement or understanding may be achieved in various ways involving voice or text communications, which may involve various communications networks or more conventional means of communications.

A step 504 follows step 502. In this step, the first device provides preconfiguration information to the second device via a long-range communications network. This preconfiguration information may be in the form of one or more standardized (e.g., SMS, WAP, or HTTP) messages. In a step 506, the second device stores the preconfiguration information received in step 504. For second device implementations according to FIGS. 2A and 2B, this step comprises storing the preconfiguration information in memory 208.

In a step 508, the first device provides preconfiguration information to the third device via a long-range communications network. As in step 504, this preconfiguration information may be in the form of one or more standardized messages. Next in a step 510, the third device stores the preconfiguration information received in step 508 in the same manner as the second device in step 506.

Upon completion of step 510, the second device and the third device possess preconfiguration information so that they may efficiently establish a short-range communications session with each other.

IV. Short-Range Encounters

Figure 6:
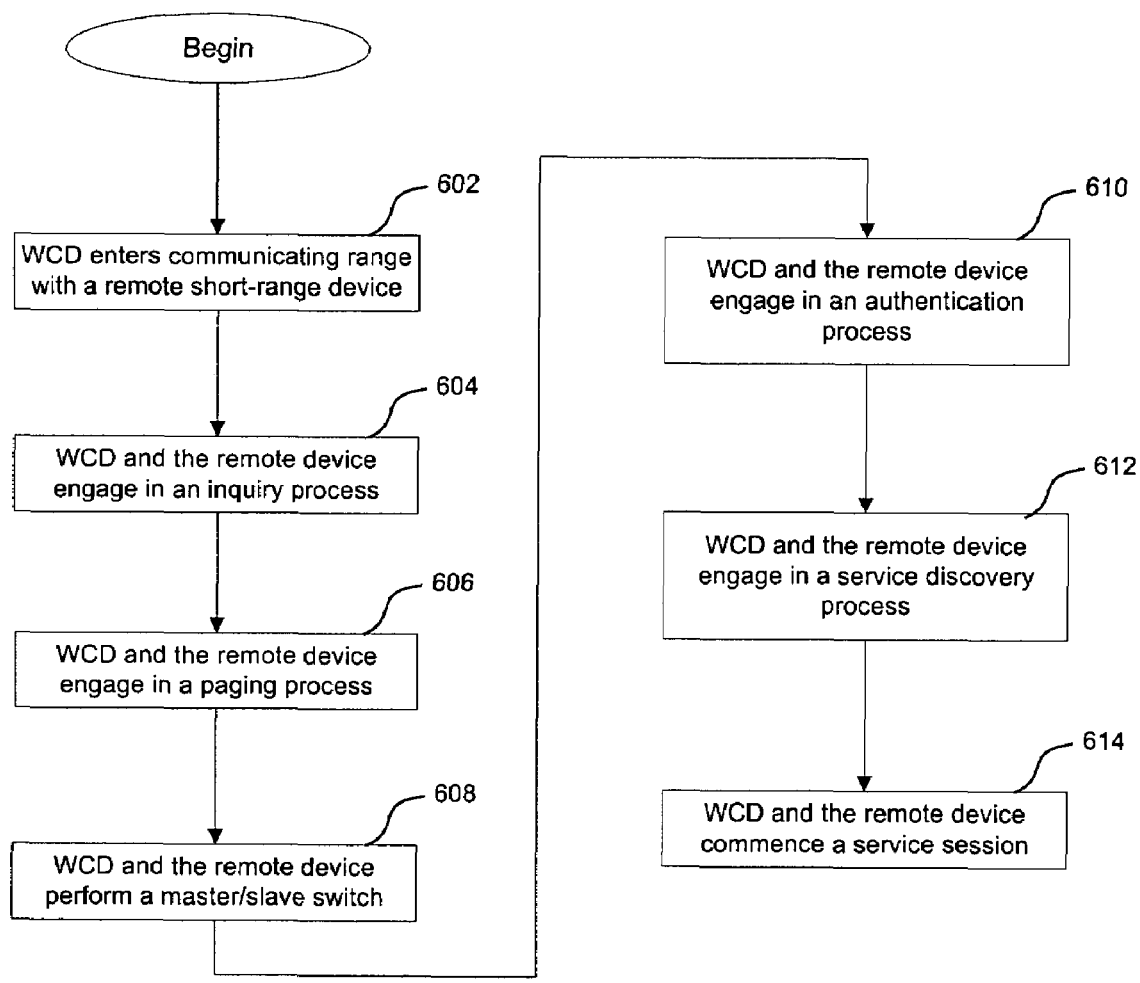
FIG. 6 is a flowchart of a conventional wireless short-range encounter.
Figure 7:
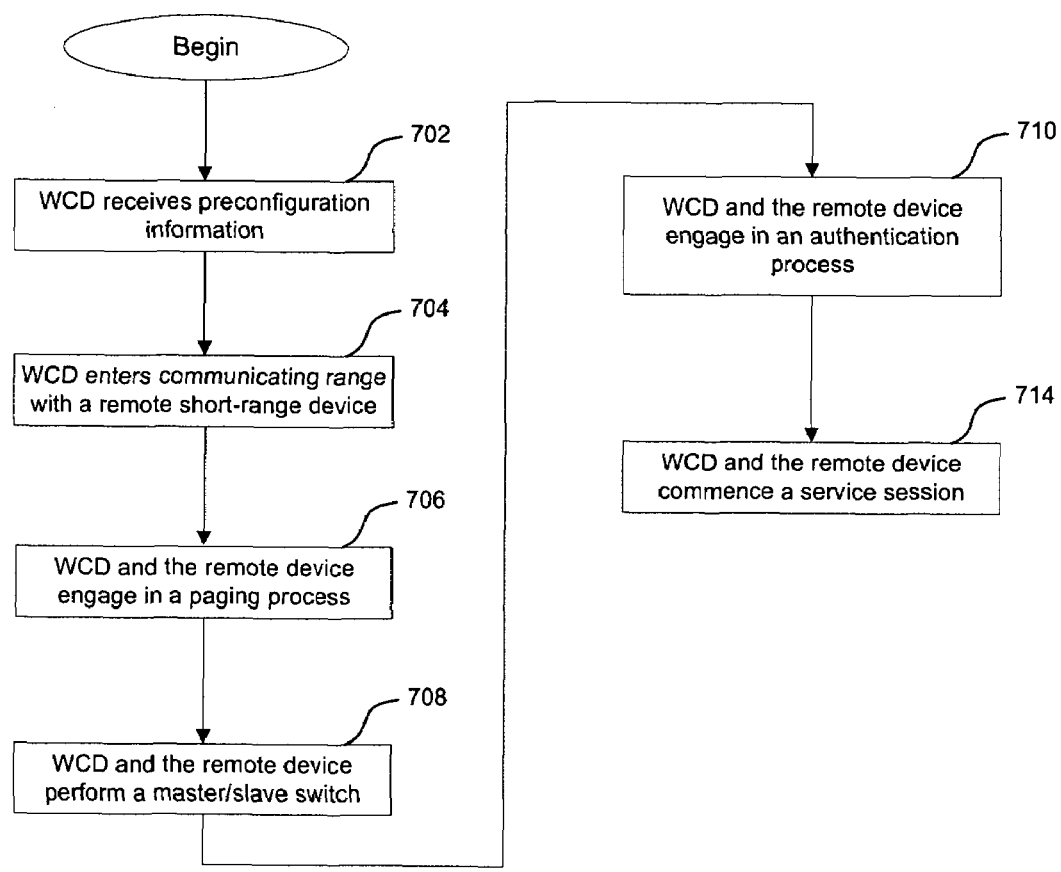
FIG. 7 is a flowchart of an efficient wireless short-range encounter according to an embodiment of the present invention.

FIGS. 6 and 7 provide examples of short-range encounters in which a communications device, such as WCD 102, establishes a short-range service session with a remote device. More particularly, FIG. 6 is a flowchart of a conventional short-range encounter in which the communications device does not have preconfiguration information, while FIG. 7 is a flowchart of an efficient short-range encounter according to the present invention in which the communications device utilizes previously received preconfiguration information.

The conventional short-range encounter of FIG. 6 is described with reference to a WCD (such as WCD 102) and a remote short-range communications device. This encounter begins with a step 602 in which the WCD enters communicating range with the remote short range device.

Next, in a step 604, the WCD and the remote device engage in an inquiry process. In this step, the WCD learns the identity (or discovers the existence) of the remote device. In Bluetooth implementations, the WCD operates in an inquiry state while the remote device operates in an inquiry scan state. When operating in the inquiry state, the WCD transmits an inquiry packet and the remote device listens for inquiry packets.

When the remote device receives the inquiry packet from the WCD, it transmits one or more frequency hop synchronization (FHS) packets, which are received by the WCD. The FHS packet(s) allow the WCD to become synchronized with the hop sequence of the remote device. In addition, the FHS packet(s) enable the WCD to derive information necessary to make a Bluetooth connection with the remote device. This information includes the native clock of the remote device (CLKN), the remote device's Bluetooth address (BD_ADDR), and error correction coding information.

In a step 606, the WCD and the remote device engage in a paging process. During the paging process, the WCD invites the remote device to join an ad hoc network. Upon successful completion, the paging process results in an unsecured connection being established between the WCD and the remote device. In Bluetooth implementations, step 606 comprises the exchange of various information between the WCD (which is in a paging state) and the remote device (which is in a page scan state).

More particularly, the WCD enters the paging state and transmits one or more paging packets. These paging packets each include an identification number based on the address of the remote device. Meanwhile, the remote device (which is in the page scan state) responds to the paging packets by transmitting a packet containing its address.

The WCD receives this packet from the remote device. In response, the WCD transmits a frequency hop synchronization (FHS) packet. The FHS packet is used to pass information that allows the remote device to synchronize with the frequency hopping sequence of the WCD. Upon receipt of this FHS packet, the remote device transmits a further packet to confirm receipt of the FHS packet.

At this point, a link is formed between the WCD and the remote device and both devices enter into a connection state. In the connection state, the WCD operates as a master device and the remote device operates as a slave device. Thus, the remote device employs the timing and frequency hopping sequence of the WCD. Additionally, the WCD transmits a packet to verify that a link has been set up. The remote device confirms this link by sending a packet to the WCD.

In an optional step 608, a master/slave switch is performed. In Bluetooth implementations, this step comprises the remote device transmitting a switch request packet that is received for acceptance by the WCD. If the WCD accepts this switch request, then the WCD will initiate a transition in which transmit timing and frequency-hopping sequences are based on the remote device instead of the WCD. Upon completion of this transition, the remote device becomes the master and the WCD becomes the slave.

As described above, the paging process of step 606 results in an unsecured connection being established between the WCD and the remote device. In an optional step 610, the WCD and the remote device engage in an authentication process when certain security features are desired. During authentication, the WCD and the remote device verify that they both have the same secret key. This secret key can then be used to effect security features, such as link encryption. Alternatively, or in addition to these authentication techniques, step 610 may comprise the WCD transmitting a personal identification number (PIN) to the remote device. This PIN "authenticates" the WCD to the remote device.

In a step 612, the WCD and the remote device engage in a service discovery process. In this step, the WCD identifies or "discovers" services provided by the remote device. In Bluetooth implementations, this step may include communicating according to the service discovery protocol (SDP). SDP involves the exchange of messages between the WCD and the remote device.

According to SDP, the remote Bluetooth device stores service discovery information in the form of database records, each including a collection of service attributes that define the services offered by the remote device. That is, each SDP service record includes a collection of service attributes containing various information. For example, attributes may indicate the particular service as well as describe the protocol stack layers that are needed to interact with the service. In addition, attributes may provide descriptive information about the service that is in a format readable by a terminal device's user.

In a step 614, the WCD and the remote device commence a service session in which the WCD utilizes one or more of the services discovered in step 612. In Bluetooth contexts, this step may comprise transmitting service identifier(s) or attribute(s) to the remote device. Such transmissions indicate which service(s) the WCD is interested in initiating.

FIG. 7 is a flowchart of a short-range connection being efficiently established between two devices according to an embodiment of the present invention. The two devices are a WCD (such as WCD 102), and a remote short-range communications device. This flowchart begins with a step 702. In this step, the WCD participates in a preconfiguration process, such as the process of FIG. 3 or the process of FIG. 4. Thus, step 702 comprises the WCD communicating with a remote device, such as preconfiguration server 112. Through these communications, the WCD receives preconfiguration information for one or more subsequent short-range communication sessions.

In a step 704, the WCD enters communicating range with a remote short range device. In a step 706, the WCD and the remote device engage in a paging process, such as the Bluetooth paging process described above with respect to FIG. 6. Thus, this step results in a connection being established between the WCD and the remote device. In Bluetooth implementations, this paging process may result in the WCD operating as a master device and the remote device operating as a slave device.

In an optional step 708, a master/slave switch is performed. In this step, the roles of the WCD and the remote device are exchanged.

In an optional step 710, the WCD and the remote device engage in an authentication process when certain security features are desired. This step may comprise the Bluetooth authentication techniques described above with reference to FIG. 6.

In a step 714, the WCD and the remote device commence a service session in which the WCD utilizes one or more of the services identified through the preconfiguration process performed in 702. Thus, as shown in FIG. 7, preconfiguration eliminates the necessity to perform inquiry and service discovery.

As described above with reference to FIG. 3, a user may be presented with one or more short-range service selection options during preconfiguration. Examples of short-range services include printer resources, e-mail, web browsing, telephony, intercom, and radio. In addition, locations associated with such services may accompany these selection options.

V. Preconfiguration Information

As described above with reference to FIGS. 3–5, the present invention provides for a communications device to receive preconfiguration information for subsequent short-range service sessions with remote devices. For a particular service offering, this preconfiguration information may include various items of information, such as an identifier of the offered service, addresses of one or more remote devices offering this service, and security information.

For instance, in the context of a Bluetooth service offering, preconfiguration information may include an SDP service identifier, one or more BD_ADDRs corresponding to devices offering the service, and security information, such as a PIN or encryption key(s). As described above with reference to FIGS. 6 and 7, the BD_ADDR is useful in initiating a paging process without first having to perform a remote device inquiry process. Security information is useful in streamlining authentication. In addition, an SDP identifier enables a communications device to efficiently indicate to a remote device which service it would like to initiate.

In addition, preconfiguration information for a service offering may include identifier(s) that indicate one or more locations where the service is offered. This enables a user to known where he can initiate a service session according to the techniques of the present invention.

VI. Bluetooth Example

Figure 8:
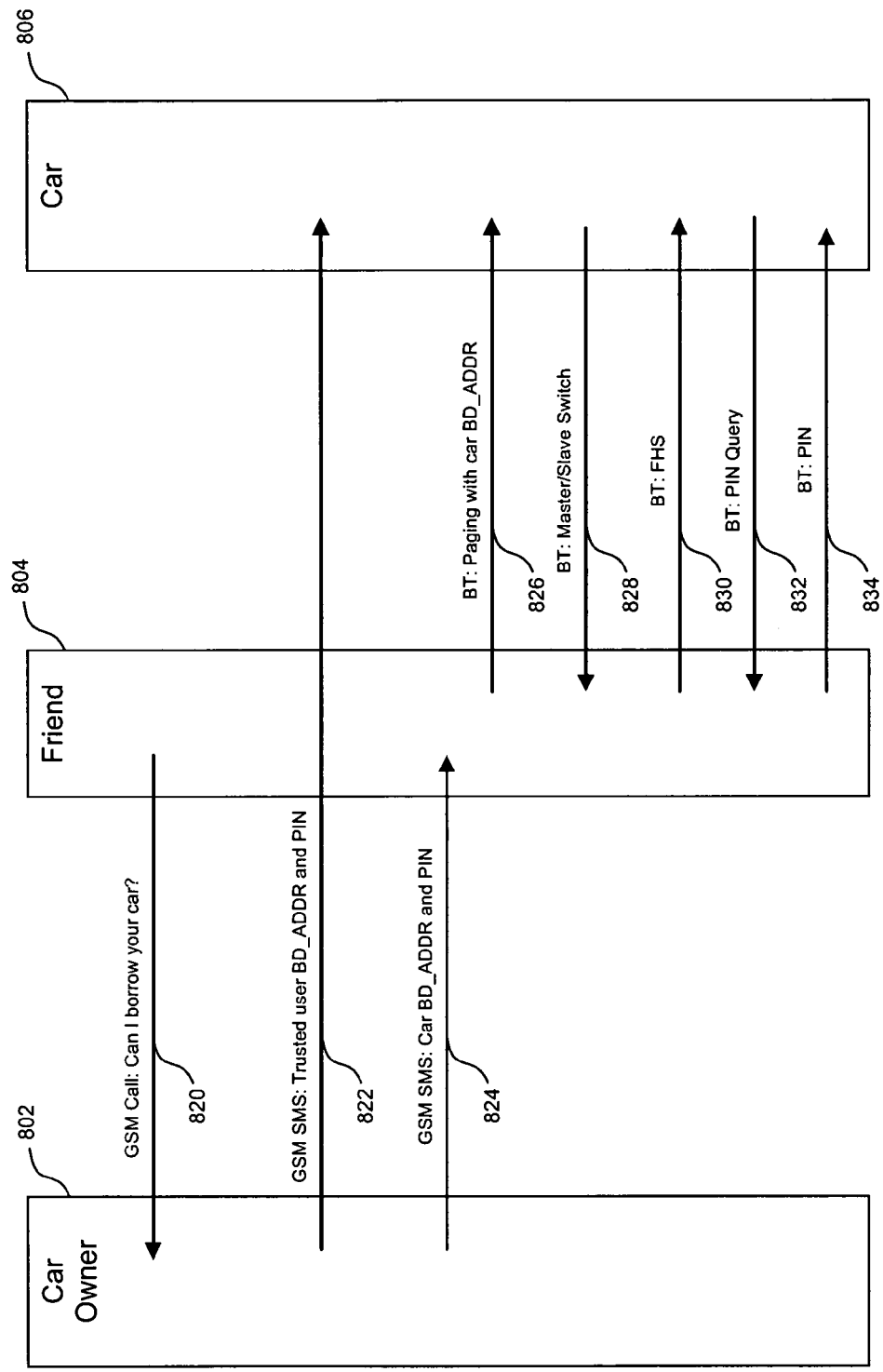
FIG. 8 is a diagram illustrating an exchange of information between multiple devices according to an embodiment of the present invention.

FIG. 8 is a diagram illustrating an exchange of information between multiple devices, according an embodiment the present invention. In particular, FIG. 8 shows a car owner and his friend preconfiguring a short-range Bluetooth connection between the friend and the car owner's car. The car is equipped with a Bluetooth and GSM capable device that controls access to the car. More particularly, this Bluetooth device will only allow trusted users operate the car. The car owner is a trusted user. However, his friend is not currently a trusted user.

FIG. 8 shows an exchange of information according to the techniques of the present invention to make the friend a trusted user and grant him access to the car. More particularly, FIG. 8 illustrates a sequence of messages exchanged between the car owner's communication device 802, the friend's device 804, and the car's device 806.

As shown in FIG. 8, this sequence begins with a step 820 in which the friend's device 804 initiates a long-range wireless GSM call to the car owner's device 802. During this call, the car owner agrees to loan his car to the friend. Next, in a step 822, the car owner sends to the car's device 806 an SMS message containing preconfiguration information across a long-range GSM network. This preconfiguration information includes the BD_ADDR of the friend's device 804 and a PIN associated with the friend. As a result of this message, the car's device 806 adds the friend's device (e.g., its BD_ADDR) to a list of allowed (trusted) users that it maintains.

In a step 824, the car owner sends to the friend's device 804 an SMS message containing preconfiguration information across the long-range GSM network. This preconfiguration information includes the BD_ADDR of the car's device 806 and a PIN associated with the car.

A step 826 follows step 824. In this step, the friend's device 804 initiates a Bluetooth paging process with the car's device 806. As shown in FIG. 8, this process involves device 804 transmitting the car's BD_ADDR to device 806. This paging process results in a Bluetooth connection being established between devices 804 and 806. In this connection, device 804 is the master device, and device 806 is the slave device. At this point, device 806 checks its list of allowed (trusted) devices and determines that device 804 is in the list.

In a step 828, the car's device 806 initiates a master slave switch by transmitting a request. In response, device 804 transmits an FHS packet in a step 830. Through steps 828 and 830, device 806 becomes the master device and device 804 becomes the slave device.

Next, in a step 832, the car's device 806 transmits a PIN query to verify that the friend is a trusted user. In response, the friend's device 804 transmits the PIN received in step 824. After device 806 receives this PIN, it determines that device 804 has satisfied three established security criteria for granting access. Namely, device 804 knows the address of device 806, device 804 knows the PIN transmitted in step 824, and device 804 is in the list of allowed devices maintained by device 806. Accordingly, device 806 causes the car's doors to unlock and allows the friend to operate the car.

VII. User Interface

Figure 9A:
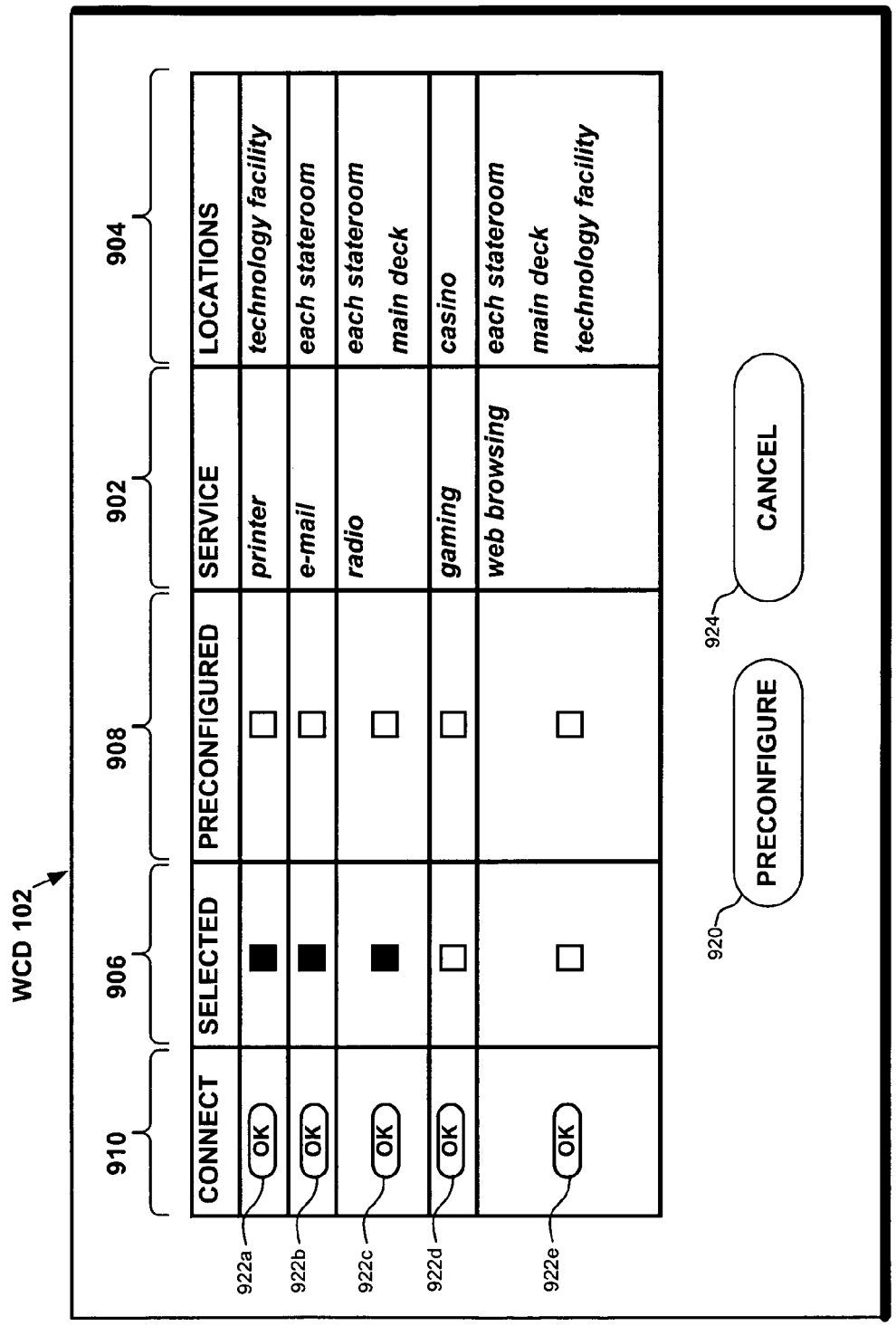
FIGS. 9A and 9B are views of a user interface displaying various service selection offerings according to various embodiments of the present invention.
Figure 9B:
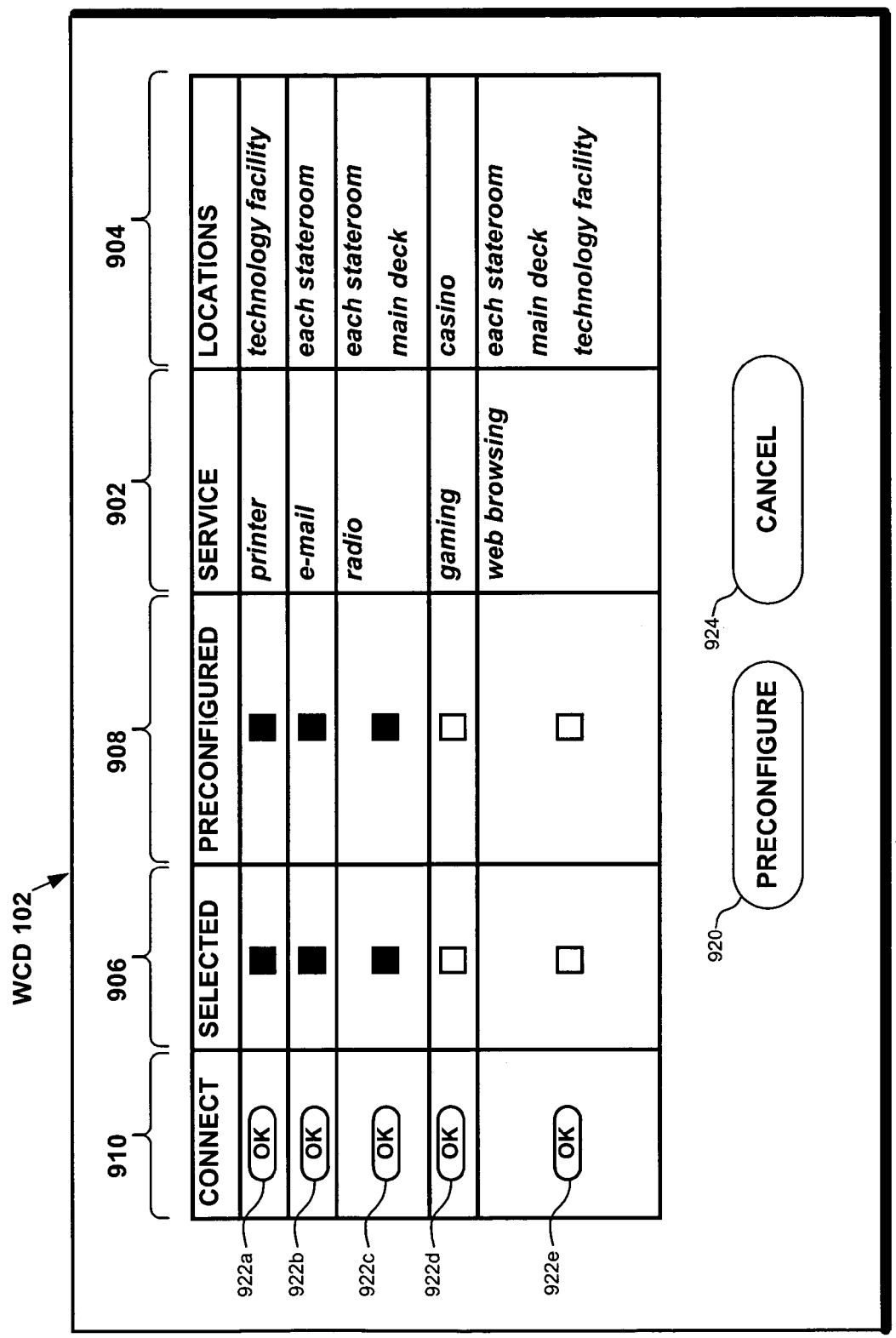

FIGS. 9A and 9B are views of a user interface for a device, such as WCD 102, according to various embodiments of the present invention. These drawings show that the user interface displays various service selection offerings. For purposes of illustration, these offerings are provided in the context of short-range communications services offered by a cruise ship. However, the features described with reference to these drawings may be employed in other contexts.

In this example, a cruise ship offers various short-range communications services to its passengers. Before boarding the cruise ship, a passenger may use his communications device to access the ship's preconfiguration service. As described above, this service may be provided by a server that is accessible through long-range communications networks, such as preconfiguration server 112.

Once accessing the preconfiguration service, the user may view and select one or more of the offered services for preconfiguration. As shown in FIGS. 9A and 9B, the cruise ship offers printer, e-mail, radio, gaming, and web-browsing services. These services are displayed to the user in a table having multiple rows, where each row includes a column 902 indicating a particular service, a column 904 indicating one or more locations where this service is available, a column 906 indicating whether the user has selected this service for preconfiguration, and a column 908 indicating whether the service has been preconfigured. In addition, each row includes a column 910 having a connection button for the corresponding service.

FIG. 9A shows that the user has selected three services for preconfiguration: printer, e-mail, and radio. However, none of these services have been preconfigured. In other words, the user's communications device has not yet received preconfiguration information for these services.

Thus, once the user has completed his selections, he may preconfigure his device for the selected services by activating preconfiguration button 920. When this button is activated, the user's device initiates an exchange of information with the preconfiguration service. This exchange of information may in the form of one or more SMS messages or in the form of requests and responses according to WAP. In this exchange of information, the user's device transmits a request to the preconfiguration service for preconfiguration information corresponding to the selected services. In response, the preconfiguration service transmits this corresponding preconfiguration information. Upon receipt of this information, the display of the user's device is updated to indicate that the device is preconfigured for the selected services, as shown in FIG. 9B.

As described above, the locations associated with the service offerings are also provided in the displays of FIGS. 9A and 9B. For example, radio service is provided on the main deck and in each stateroom. When the user boards the cruise ship, he may view his device's preconfiguration settings, as shown in FIG. 9B, to determine which services are available in his present location.

For example, FIG. 9B shows that when the user is on the main deck, web browsing and radio services are available to him. If the user desires to utilize any of these presently available services, he activates the connect buttons 922 for the corresponding services.

VIII. Scenarios

The techniques of the present invention may be employed in various scenarios. One such scenario involves a dating service, which finds matches for people. By using a device, such as WCD 102, a subscriber of this service uploads personal information to the service through a long-range communications network. This personal information may indicate the user's particular dating preferences and requirements. The service processes this personal information and identifies one or more "matching" people. At this point, the service sends the user's preconfiguration information corresponding to these matching persons via long-range communications network 104. In addition to this preconfiguration information, the user may receive a list of favorite party places (e.g., nightclubs) provided by the matching people.

Accordingly, the user may efficiently establish a short-range communications connection with the matching people's devices. Moreover, when the user is in the favorite party places, he can page that person with the associated known BD_ADDR.

A further scenario involves a situation where a user may desire his communications device to have limited short-range capabilities. This desire may arise from security concerns. For example, a user may want to prevent his Bluetooth device from entering the inquiry and inquiry scan operational states. This will prevent the device from being discovered by other devices, or discovering other devices. Such limitations may be desirable during an ongoing communications session (either short-range or long-range) where confidential information is being exchanged.

However, during such sessions, a user may prefer to establish a short-range communications session with someone familiar. Such a communications session may involve, for example, the playing of interactive games during a boring business presentation. To establish such a session, the user may send preconfiguration information (e.g., his device's BD_ADDR) to his friend across a long-range communications network. As described above, this information may be in a standardized message (e.g., SMS, WAP, or HTTP) format. To initiate a short-range game playing session, the friend may at this point initiate a Bluetooth paging process with the received BD_ADDR.

Another scenario involves an airline that provides free information services in the airport to its preferred passengers through short-range wireless communications technologies. To obtain this free service, a preferred passenger visits the airline's password protected web site and sends an SMS message containing preconfiguration information so that the airline's short-range communications devices may efficiently establish short-range communications sessions with the passenger's devices.

IX. Software Installation

As stated above, it is desirable for mobile devices, such as WCD 102, to engage in a short-range service session spontaneously. To accommodate for devices that are not equipped with the necessary software to support such service sessions, the present invention provides software installation techniques for mobile devices. These techniques may be employed during a short-range device encounter to obtain connectivity software from remote devices, such as Bluetooth access points. For example, in the processes of FIGS. 6 and 7, these software installation techniques may be employed prior to establishing a service session, as performed in steps 614 and 714.

Figure 10:
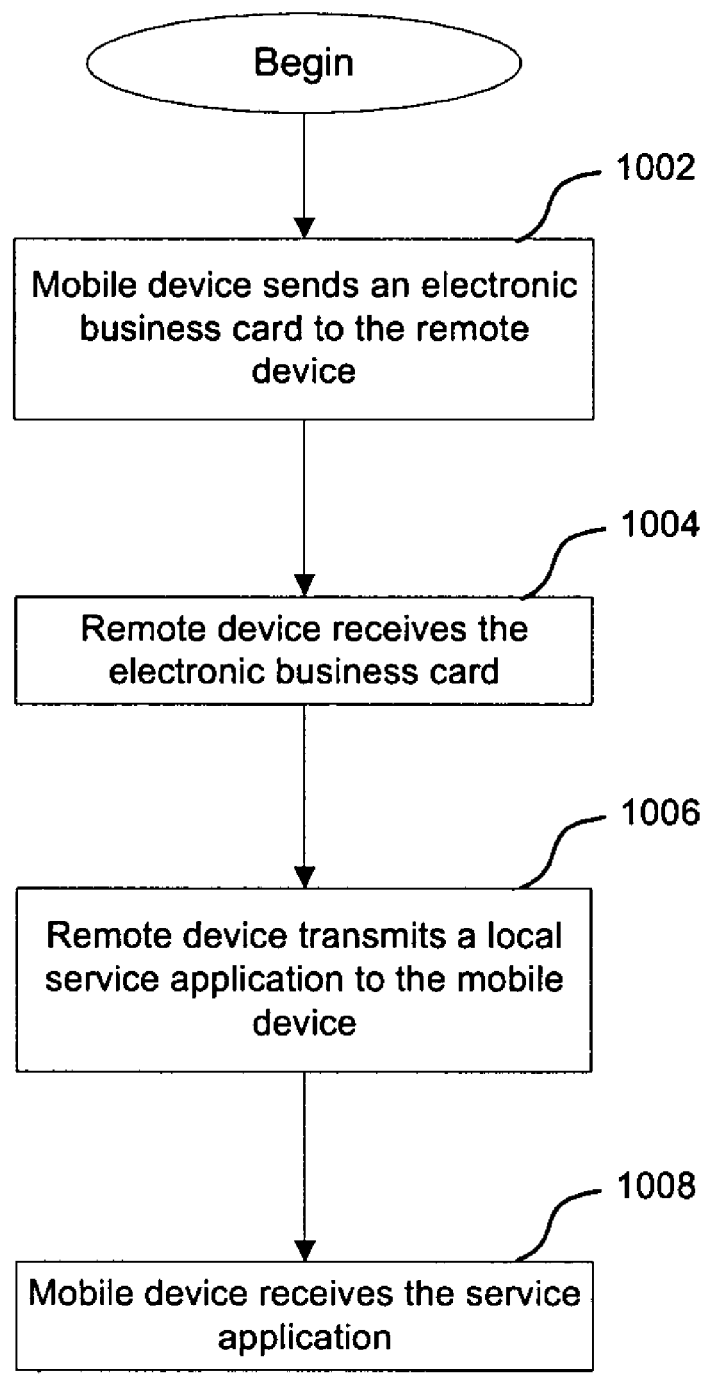
FIGS. 10 and 11 are flowcharts of software installation processes according to embodiments of the present invention.

FIG. 10 is a flowchart of a software installation process according to an embodiment of the present invention. This process may be employed when the user of a mobile device, such as WCD 102, knows that he is within the coverage area of a remote short-range device, such as a Bluetooth access point. This process begins with a step 1002 in which the mobile device sends an electronic business card (e.g., a vCard) to the remote device. In embodiments, this business card identifies the user.

The user may know it is within the remote device's coverage area for various reasons. For example, the user may know this from preconfiguration information it previously received according to the techniques described above. However, the user may also determine that it is within the remote device's coverage area by making an inquiry of nearby devices and learning of the remote device by its identifier (such as an access point identifier) received through the inquiry process. In a step 1004, the remote device receives the business card transmitted in step 1002.

Next, in a step 1006, the remote device transmits a local service application to the mobile device. This local service application software may be in the form of a Symbian application or a java application. The remote device may transmit the local service application software through obex file transfer. In a step 1008, the mobile device receives the application, where it appears in the user's inbox. At this point, the user can install the software and commence local services with the remote device.

Figure 11:
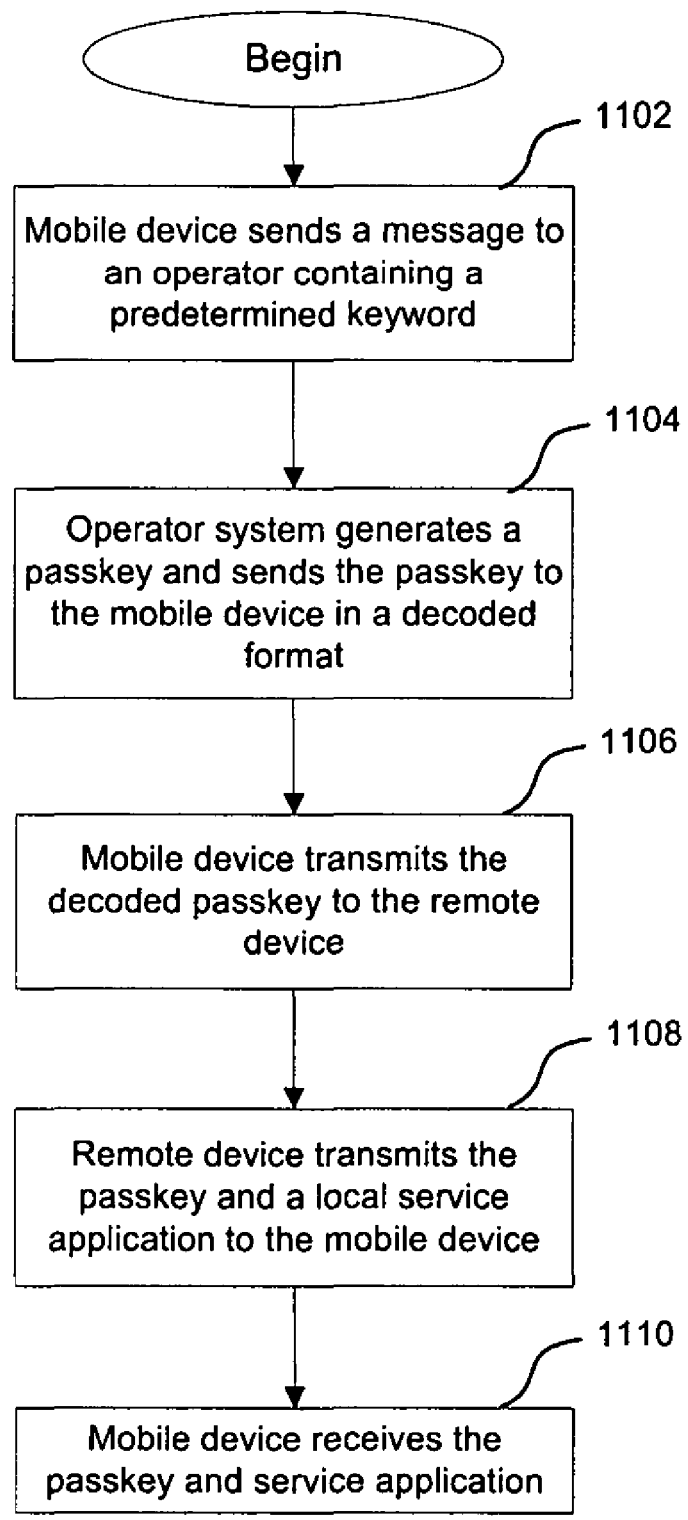

The present invention also provides software installation techniques that include authentication procedures. One such technique is shown in the flowchart of FIG. 11. This flowchart begins with a step 1102, in which the mobile device user sends an SMS message containing a predetermined keyword to an operator service number across a long-range network, such as network 104. The user of the mobile device may be informed of the operator service number through audio and/or visual indications when the user enters the service area. Such indications include audio broadcasts and signs.

In response to this message, the operator system generates and transmits a passkey to the user in a step 1104. This passkey may be decoded into an image format, such as JPEG, and sent to the mobile device via a multimedia messaging service (MMS) message.

Next, in a step 1106, The user sends the decoded passkey to a remote short-range device, such as a Bluetooth access point. In response, the remote device transmits the passkey and a local service application to the mobile device in a step 1108. This local service application may be in the form of a Symbian application or a java application. The remote device may transmit the local service application software through obex file transfer.

In a step 1110, the mobile device receives the application software, where it appears in the user's inbox. At this point, the user can install the software and commence local services with the remote device. The passkey transmitted with the software allows the user to obtain local services. Accordingly, once a connection with the remote device has been established, the remote device requests this passkey to be transmitted by the mobile device. Once the remote device receives this passkey, the mobile device is able to use local services provided by the remote device.

X. Conclusion

While various embodiments of the present invention have been described above, it should be understood that they have been presented by way of example only, and not limitation. For instance, the present invention is not limited to Bluetooth. Furthermore, the present invention can be applied to previous and future developed Bluetooth standards, as well as variations from such Bluetooth standards.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of setting up a local service session in a short-range wireless communications network, comprising:
   receiving preconfiguration information over a long-range network, the preconfiguration information relating to the establishment of the local service session in the short-range wireless communication network and including service options;
   establishing the local service session in the short-range wireless communication network using the received preconfiguration information, after selection from the service options.

2. The method of claim 1, further comprising:
   sending a request for the preconfiguration information over the long range network.

3. The method of claim 2, wherein the request includes an identifier corresponding to the local service session.

4. The method of claim 1, wherein said receiving step includes receiving an identifier of a remote short-range wireless communications device.

5. The method of claim 4, wherein the identifier is a Bluetooth device address (BD_ADDR).

6. The method of claim 1, wherein said receiving step includes receiving security information.

7. The method of claim 6, wherein the security information includes a personal identification number (PIN).

8. The method of claim 6, wherein the security information includes an encryption key.

9. The method of claim 1, wherein said receiving step includes receiving an identifier of an offered short-range wireless service.

10. The method of claim 1, wherein said receiving step includes receiving an identifier indicating a location where a short-range wireless service is offered.

11. The method of claim 1, wherein said establishing step includes establishing a connection with a Bluetooth device.

12. The method of claim 11, wherein the Bluetooth device is an access point offering the local service session.

13. The method of claim 1, further comprising:
   obtaining short-range wireless service application software from the remote device.

14. A method of setting up a local service session in a short-range wireless communications network between a first wireless communications device and a second wireless communications device, comprising:
   (a) sending a first preconfiguration transmission over a long-range network to the first wireless communications device, the first preconfiguration transmission including information relating to the establishment of the local service session in the short-range wireless communications network; and
   (b) sending a second preconfiguration transmission over the long-range network to the second wireless communications device, the second preconfiguration transmission including information relating to the establishment of the local service session in the short-range wireless communications network.

15. The method of claim 14, wherein step (a) comprises sending an identifier of the second communications device.

16. The method of claim 15, wherein the identifier of the second communications device is a Bluetooth device address (BD_ADDR).

17. The method of claim 16, wherein step (a) further comprises sending a personal identification number (PIN) to the first communications device.

18. The method of claim 14, wherein step (b) comprises sending an identifier of the first communications device.

19. The method of claim 18, wherein the identifier of the first communications device is a Bluetooth device address (BD_ADDR).

20. The method of claim 19, wherein step (b) further comprises sending a personal identification number (PIN) to the second communications device.

21. The method of claim 14, wherein step (b) comprises authorizing the second device to engage in the local service session with the first device only upon receipt of particular information included in the first preconfiguration transmission by the second device from the first device.

22. A wireless communications device, comprising:
   a short-range wireless communications portion for communicating across short-range wireless communications networks;
   a long-range wireless communications portion for communicating across long-range communications networks;
   a memory;
   a processor that executes instructions stored in the memory for:
   receiving preconfiguration information over a long-range wireless network, the preconfiguration information relating to the establishment of a local service session in a short-range wireless communications network and including service options;

establishing the local service session in the short-range wireless communications network using the received preconfiguration information, after selection from the service options.

23. A system for setting up a local service session in a short-range wireless communications network, comprising:
means for receiving preconfiguration information over a long-range network, the preconfiguration information relating to the establishment of the local service session in the short-range wireless communication network and including service options;
means for establishing the local service session in the short-range wireless communication network using the received preconfiguration information, after selection from the service options.

24. The system of claim 23, further comprising:
means for sending a request for the preconfiguration information over the long range network.

25. The system of claim 24, wherein the request includes an identifier corresponding to the local service session.

26. The system of claim 23, wherein said receiving means includes means for receiving an identifier of a remote short-range wireless communications device.

27. The system of claim 26, wherein the identifier is a Bluetooth device address (BD_ADDR).

28. The system of claim 23, wherein said receiving means includes receiving security information.

29. The system of claim 28, wherein the security information includes a personal identification number (PIN).

30. The system of claim 28, wherein the security information includes an encryption key.

31. The system of claim 23, wherein said receiving means includes means for receiving an identifier of an offered short-range wireless service.

32. The system of claim 23, wherein said receiving means includes means for receiving an identifier indicating a location where a short-range service is offered.

33. The system of claim 23, wherein said establishing means includes means for establishing a connection with a Bluetooth device.

34. The system of claim 33, wherein the Bluetooth device is an access point offering the local service session.

35. The system of claim 23, further comprising:
means for obtaining short-range wireless service application software from the remote device.

36. A system for setting up a local service session in a short-range wireless communications network between a first wireless communications device and a second wireless communications device, comprising:
means for sending a first preconfiguration transmission over a long-range network to the first wireless communications device, the first preconfiguration transmission including information relating to the establishment of the local service session in the short-range wireless communications network; and
means for sending a second preconfiguration transmission over the long-range network to the second wireless communications device, the second preconfiguration transmission including information relating to the establishment of the local service session in the short-range wireless communications network.

37. The system of claim 36, wherein said means for sending a first preconfiguration transmission comprises means for sending an identifier of the second communications device.

38. The system of claim 37, wherein the identifier of the second communications device is a Bluetooth device address (BD_ADDR).

39. The system of claim 38, wherein said means for sending a first preconfiguration transmission further comprises means for sending a personal identification number (PIN) to the first communications device.

40. The system of claim 36, wherein said means for sending a second preconfiguration transmission comprises means for sending an identifier of the first communications device.

41. The system of claim 40, wherein the identifier of the first communications device is a Bluetooth device address (BD_ADDR).

42. The system of claim 41, wherein said means for sending a second preconfiguration transmission further comprises sending a personal identification number (PIN) to the second communications device.

43. The system of claim 36, wherein means for sending a second preconfiguration transmission comprises means for authorizing the second device to engage in the local service session with the first device only upon receipt of particular information included in the first preconfiguration transmission by the second device from the first device.

44. A device for setting up a local service session in a short-range wireless communications network between a first wireless communications device and a second wireless communications device, comprising:
(a) a processor;
(b) a long range communication interface coupled to the processor for receiving and transmitting long range transmissions over a long range network, and
(c) a memory coupled to the processor and including software programs configured for:
(i) sending a first preconfiguration transmission over the long-range network to the first wireless communications device, the first preconfiguration transmission including information relating to the establishment of a local service session in the short-range wireless communications network; and
(ii) sending a second preconfiguration transmission over the long-range network to the second wireless communications device, the second preconfiguration transmission including information relating to the establishment of the local service session in the short-range wireless communications network.

45. The device of claim 44 further including a short-range interface coupled to the processor for receiving and transmitting short-range transmissions over the short-range network.

46. A method of setting up a local service session in a short-range wireless communications network, comprising:
sending a service request for preconfiguration information for establishing a local service session with a proximate device over a short-range wireless communications network, wherein the service request is sent to a remote destination over a long-range network;
receiving the requested preconfiguration information over the long-range network, the preconfiguration information including information relating to the establishment of the local service session with a proximate device over the short-range wireless communications network;
performing link authentication for the local service session with the proximate device over the short-range wireless communications network using the received preconfiguration information; and establishing the local service session with the proximate device over the short-range wireless communications network upon successful link authentication.

47. The method of claim 46, wherein the request includes an identifier corresponding to the local service session.

48. The method of claim 46, wherein said receiving step includes receiving an identifier of a proximate short-range wireless communications device.

49. A device for setting up a local service session in a short-range wireless communication network with a second wireless communications device, comprising:
   (a) a processor;
   (b) a long-range communication interface coupled to the processor for receiving and transmitting long range transmissions over a long-range network,
   (c) a short-range communication interface coupled to the processor for receiving and transmitting short-range transmissions over a short-range network; and
   (d) a memory coupled to the processor and including software programs configured for:
      (i) sending a service request for preconfiguration information for establishing a local service session with a proximate device over the short-range wireless communication network, wherein the service request is sent to a remote destination over the long-range network;
      (ii) receiving the requested preconfiguration information over the long-range network, the preconfiguration information including information relating to the establishment of the local service session with a proximate device over the short-range wireless communication network;
      (iii) performing link authentication for the local service session with the proximate device over the short-range wireless communication network using the received preconfiguration information; and
      (iv) establishing the local service session with the proximate device over the short-range wireless communications network upon successful link authentication.

* * * * *